(12) United States Patent
Hellstrom

(10) Patent No.: US 8,229,486 B2
(45) Date of Patent: Jul. 24, 2012

(54) SYNCHRONIZED WIRELESS NETWORKED SYSTEM

(75) Inventor: Ake Hellstrom, Columbus, OH (US)

(73) Assignee: ABB Ltd., Dublin (IE)

( * ) Notice: Subject to any disclaimer, the term of this patent is extended or adjusted under 35 U.S.C. 154(b) by 501 days.

(21) Appl. No.: 12/335,130

(22) Filed: Dec. 15, 2008

(65) Prior Publication Data
US 2009/0168749 A1     Jul. 2, 2009

Related U.S. Application Data

(60) Provisional application No. 61/017,265, filed on Dec. 28, 2007.

(51) Int. Cl.
*H04B 7/00* (2006.01)
(52) U.S. Cl. .......................................... 455/500; 455/39
(58) Field of Classification Search ................ 455/39, 455/500, 502; 162/232
See application file for complete search history.

(56) References Cited

U.S. PATENT DOCUMENTS

| | | | |
|---|---|---|---|
| 3,651,477 A | 3/1972 | Bartlett et al. | |
| 4,145,205 A | 3/1979 | Farkas et al. | |
| 5,343,296 A | 8/1994 | Hellstrom | |
| 5,479,720 A * | 1/1996 | Hellstrom et al. | 33/501.02 |
| 6,071,382 A | 6/2000 | Tsuchiya et al. | |
| 6,373,376 B1 | 4/2002 | Adams et al. | |
| 7,010,294 B1 | 3/2006 | Pyotsia et al. | |
| 7,082,348 B1 * | 7/2006 | Dahlquist et al. | 700/128 |
| 7,218,356 B2 * | 5/2007 | Rowe | 348/521 |
| 7,370,824 B1 * | 5/2008 | Osborne | 242/563 |
| 7,531,973 B2 * | 5/2009 | Baumann et al. | 318/400.01 |

FOREIGN PATENT DOCUMENTS

| | | |
|---|---|---|
| EP | 1037394 A1 | 9/2000 |
| JP | 2000008291 A | 1/2000 |

OTHER PUBLICATIONS

European Patent Office, Extended European Search Report for EP Application No. 08 17 2385 Published as EP 2 075 657 A1, dated May 8, 2009, issued by The European Patent Office and including the European Search Report, dated Apr. 28, 2009.

* cited by examiner

*Primary Examiner* — Brian Young
(74) *Attorney, Agent, or Firm* — Michael M. Rickin

(57) ABSTRACT

A sheet making system that has two or more separated nodes one of which may be a scanner sensing head and the other of which may be a scanner end column. Each node has a wireless system and receives power from a common AC source. Each node receives events data associated with the wireless system. Each wireless system has a circuit that obtains from the common AC power source an associated events data acquisition clock that is the same for all of the wireless systems to time synchronize to each other the associated events data signals at each of the two or more nodes. A central computer may be connected to the two or more nodes. The communication between the computer and each of the two or more nodes can be wireless or by a LAN or other mechanisms.

12 Claims, 11 Drawing Sheets

SYNCHRONIZED WIRELESS NETWORKED SYSTEM

CROSS REFERENCE TO RELATED APPLICATION

This application claims the priority of U.S. provisional patent application Ser. No. 61/017,265 filed on Dec. 28, 2007, entitled "Synchronized Wireless Networked System" the contents of which are relied upon and incorporated herein by reference in their entirety, and the benefit of priority under 35 U.S.C. 119(e) is hereby claimed.

1. FIELD OF THE INVENTION

The present invention relates to sheet making processes and more particularly to obtaining information from the sensors mounted on the scanners used in such processes.

2. DESCRIPTION OF THE PRIOR ART

Scanning measurements are deployed on sheet processes in order to sense multiple web profile properties such as for example basis weight, moisture, caliper, color and coat weight. There may be one or several scanners installed on a process to measure the web at different conditions, for instance before and after coating in a paper machine. Each scanner may have single sided or dual sided measurement heads. Examples of applications of scanning measurements on sheet processes are described in U.S. Pat. Nos. 5,479,720 and 5,343,296.

FIG. 1 shows schematically a scanner 10 typically used in the flat sheet industry, for instance papermaking. The scanner 10 includes moving sensor heads 12 that traverse across the web 24 which is between the sensor heads 12. Each time the heads 12 scan across the web 24, a profile is generated. The increased sheet speed of modern paper machines or converting equipment has demanded higher scan speeds. For instance, a scan speed of 1 m/sec with a travel time from one edge to the other edge of the web 24 of less than 10 seconds may be required. This corresponds to over 3 million scan cycles per year. Failures of moving parts in the scanner may call for a costly machine stop and emergency repair. This makes very high demands for the longevity of moving parts.

In order to supply the moving head 12 with power, signal, communication and air/water fluid utilities, a flex cable track 14 is commonly utilized inside the scanner 10. FIG. 2 shows the working details of the moving head 12 and the flex cable track 14. Inside the cable track 14 there may reside various hoses and cables such as flexing hoses 16 for the air/water fluid utilities, power cables, signal and communication cables. Signal cables are of lighter construction than power cables and thus may be more prone to fatigue failure or jacket damage as compared to the power cables. Furthermore, power distribution can as a design option use electrified rails with sliding contact bus bars instead of flex cables. Flexible fluid lines utilizing a braided design with extruded co-polymers have good long-term reliability in the flexing mode.

Several digital communication methods in scanner flex cables have been suggested, for instance as described in U.S. Pat. No. 6,071,382. The digital communications cable still has to flex the same number of cycles as an analog signal cable.

Distributed remote wireless data acquisition based on popular standard protocols are reaching the manufacturing place and therefore appear to offer an alternative to signal cables but have not been used in scanning applications. One of the difficulties in adapting such known distributed remote wireless data acquisition to sheet scanners is the high per sensor data rate in the scanners. Thus using this technique in scanners would add communications overhead to an already intensive real time data load. The data rates for scanning instruments may be several thousand samples per second from each sensor and that rate is much faster than the data rates in traditional industrial sensors.

Another difficulty in adapting such distributed remote wireless data acquisition to sheet scanners is the need for precise timing synchronization between nodes. The different clocks in a distributed system must be accurately synchronized in order to avoid data timing mismatch between the different nodes. For example, the relation between the sensor signals and the head position signals must be well timed to generate an accurate high resolution profile of the sheet properties. Therefore, such wireless network synchronization solutions that may be used for standard industrial automation are not for the reasons given above applicable for scanning instruments.

One scheme different from those described above is to use a wire that is shared by nodes for hardware clock synchronization. Using a dedicated separate wire for this task is impractical in an industrial process such as papermaking. The wire used for hardware clock synchronization may however be the AC power line shared within a plant. Known methods for synchronization using power line frequency each require a special communications system and are not applicable to the most widely accepted high-speed wireless networks today, for instance IEEE802.11. These special communication schemes are not supported by standard and popular low cost wireless networks.

FIG. 3 shows a scanner 10 connected to a central computer 18 having an associated operator display, the computer and display 18 typically located in a process control room (not shown). The scanner 10 is connected to the control room using a standard LAN cable 20. The central computer 18 and the scanner 10 receive power from shared AC power, sometimes via dedicated isolation transformers such as transformer 22 shown in FIG. 3.

One potential reliability problem in scanners involves flexing cables 16 that connect the moving head 12 to the stationary portion 10a of the scanner. The cables 16 are subject to significant bending stress, fatigue and wear due to the continuous motion by head scanning. This bending stress, fatigue and wear has become more severe by faster scan speeds. The failure mode for cables 16 may involve fatigue damage starting with intermittent conductor continuity at the early onset of the problem. This fatigue damage may cause temporary loss of measurement or inaccurate data in analog signal cables. For flexing digital communications cables, the fatigue mechanism is similar to analog cables since they have to endure the same number of scans. An additional complication for flexing digital communication cables involves compromises in mechanical design due to the need for controlled electric impedance combined with long-life bending properties.

Another consideration with scanner installation on processes involves the cost of installing data cables between the scanner 10 and the control room or similar remote location. It is necessary to provide the scanning measurement information to central process control computers and operator displays 18. The cables 20 sometimes have to pass through machine obstructions or be routed around them, adding to the cost and time required to install a scanning system.

A difficulty that may arise from utilization of multiple scanners 10 on a process involves data synchronization between scanners involved in coat weight calculation, moisture measurement compensation, or other measurement calculations that may require simultaneous information from multiple scanners. Methods have been suggested to operate the scanners 10 in such a manner that they see the same spot on the web. One such method is described in Japanese Patent JP2000008291. However, to do this accurately requires that all scanner computers 18 are precisely synchronized in real time. This is complex to achieve with conventional wireless communications methods that introduce variable latency, and may even require use of dedicated hard wired discrete signals.

In order to diagnose and maintain a state-of the-art complex industrial measurement scanner 10, service tools include portable or fixed service work stations, note book computers, personal digital assistants, and communications analyzers. Methods have been suggested to utilize wireless communication to a portable service workstation for this purpose. Some examples of wireless service tools for a process automation system are disclosed in U.S. Pat. No. 7,010,294.

When working on problems in the scanner 10, speed to resolve the issue and mobility for the service person is important, since the scanner 10 is very essential in papermaking control. Adding wireless technology to a conventional scanner for this sole purpose tends to increase the scanner cost and it still provides only limited insight into the complexity of a scanner, since for example, various hard wired communication data streams to the sensors 12 mounted on a scanner 10 are not available to the service personnel through the wireless technology.

There are rapidly emerging industrial wireless communications systems that have established mainstream uses in office or home environment, for instance IEEE802.11, Bluetooth, IRDA and UWB, as well as systems operating on dedicated industrial frequency bands. Such communications systems utilize packet communications methods, where network loading, communications re-try due to noise, disturbance from other devices and similar real time aberrations introduce variable latency. It is a complex task to achieve synchronization of information from different data acquisition nodes on a wireless network. Scanning measurements often demand timing precision of one millisecond or better, in order to properly combine sensor information from different nodes.

The present invention solves these problems in the prior art by the use of a wireless network from the scanning sensing sensors to the control room that provides accurate timing of sensor data from different nodes. The invention is also applicable to general industrial automation networks.

SUMMARY OF THE INVENTION

A method for time synchronizing signals in a sheet making system that has two or more nodes separated from each other that each receive signals having data therein about sheet making events associated with each of the two or more nodes. The method:

provides at each of the two or more nodes a wireless system for acquiring at each of the nodes the signals having the associated sheet making events data, each of the wireless systems having a distinct processing device; and compares at each of the two or more nodes the timing of associated sheet making events data signals to the timing of the AC voltage waveform on a power line connected to power each of the two or more wireless sheet making events data acquiring systems to thereby time synchronize the associated sheet making events data signals at each of the two or more nodes to each other.

A method for time synchronizing signals in a sheet making system that has two or more nodes separated from each other that each receive signals having data therein about sheet making events associated with each of the two or more nodes. The method:

provides at each of the two or more nodes a wireless system for acquiring at each of the nodes the signals having the associated sheet making events data, each of the wireless systems having a distinct processing device and a data acquisition clock; and uses an AC power signal on a power line connected to power each of the two or more wireless sheet making events data acquiring systems as a source of a common clock for all of the two or more wireless sheet making events data acquiring systems data acquisition clocks to time synchronize the associated sheet making events data signals at each of the two or more nodes to each other.

A sheet making system that has:

two or more nodes separated from each other;

each of the two or more nodes comprising a wireless system for acquiring at each of the nodes signals having associated events data, each of the wireless systems receiving signals having data therein about events associated with a respective one of each of the two or more wireless systems and connected to receive AC power from a common source of AC power; and each of the two or more wireless systems having:

a circuit that obtains from the common source of AC power an associated events data acquisition clock that is the same for all of the wireless systems at the two or more nodes to thereby time synchronize the associated events data signals at each of the two or more nodes to each other; and a distinct processing device.

DETAILED DESCRIPTION

Figure 4:
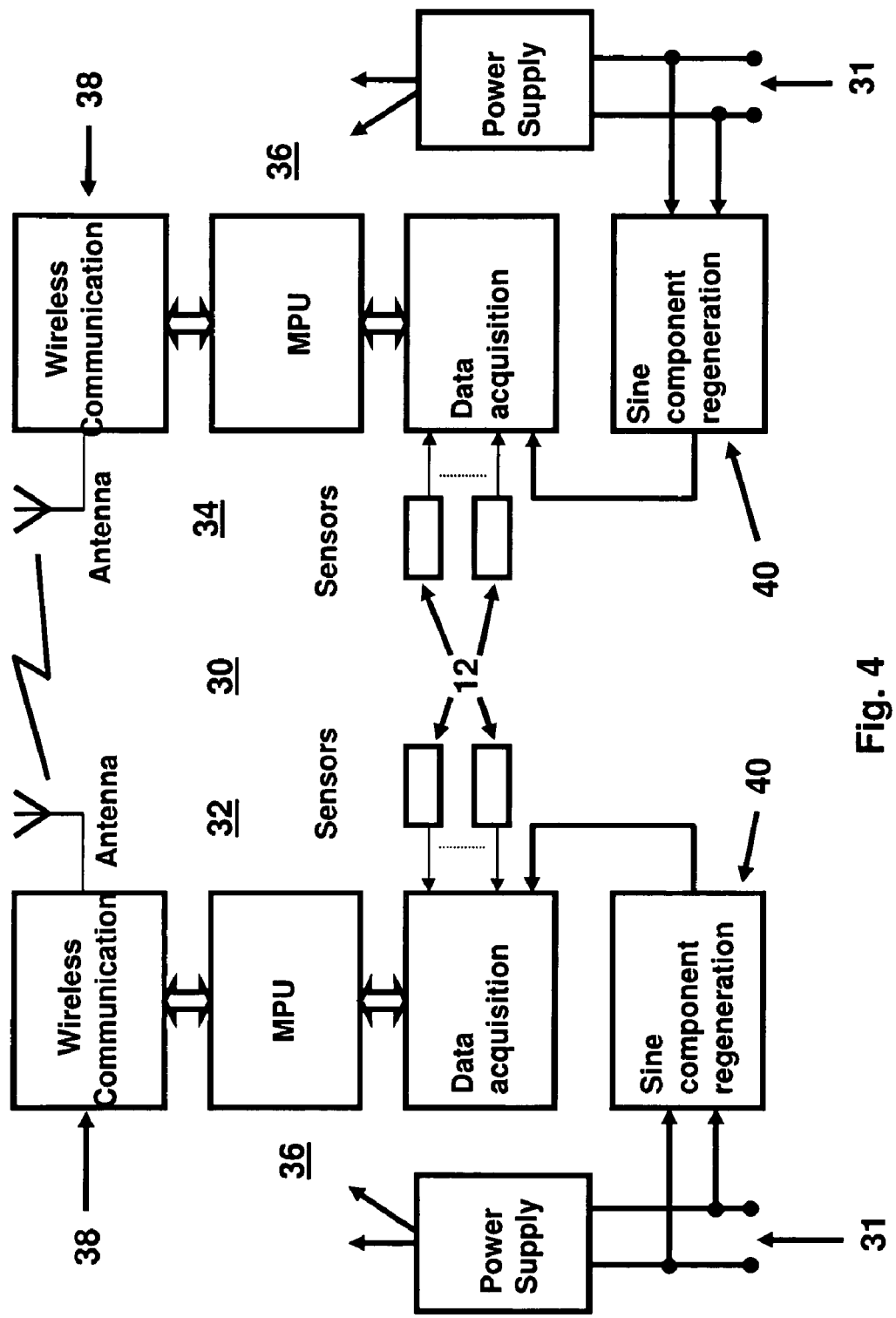
FIG. 4 shows a wireless remote data acquisition system embodied in accordance with the present invention.

Referring now to FIG. 4, there is shown a wireless remote data acquisition system 30 embodied in accordance with the present invention. System 30 is shown with only two active remote nodes 32 and 34 although any number of nodes may be used up to the interface capacity limits. Each remote node 32 and 34 includes a microprocessor based remote data acquisition system 36 with a standard wireless communications interface 38, and an AC power timing monitoring circuit 40 that may be separate hardware or part of the data acquisition function for the other process signals. Each of the remote nodes 32 and 34 can be essentially identical in structure, although the I/O for sensors or process control may be tailored for specific needs.

In accordance with the present invention, the data acquisition system 36 is used, in addition to the conventional channels for measurement signals, to monitor with an extra channel the phase of the AC power line voltage 31. For a physically large and power demanding piece of instrumentation like a process scanner, AC is typically the preferred power distribution in conjunction with distributed DC power supplies near each point of use. Thus, the timing of individual process signals to each data acquisition node 32, 34 in the scanner 10 can be compared to the timing of the AC line voltage waveform.

Since all the AC power within a plant has a common frequency and predetermined and relatively precise phase to phase relations, the AC power signal 31 is used as a common clock source for several physically separated wireless data acquisition systems that derive power from the AC system. The end result is that each wireless data acquisition node 32, 34 can time stamp the acquired signals with a timing reference from a common AC signal, and thus enable a timing synchronization for all of the nodes.

Figure 5:
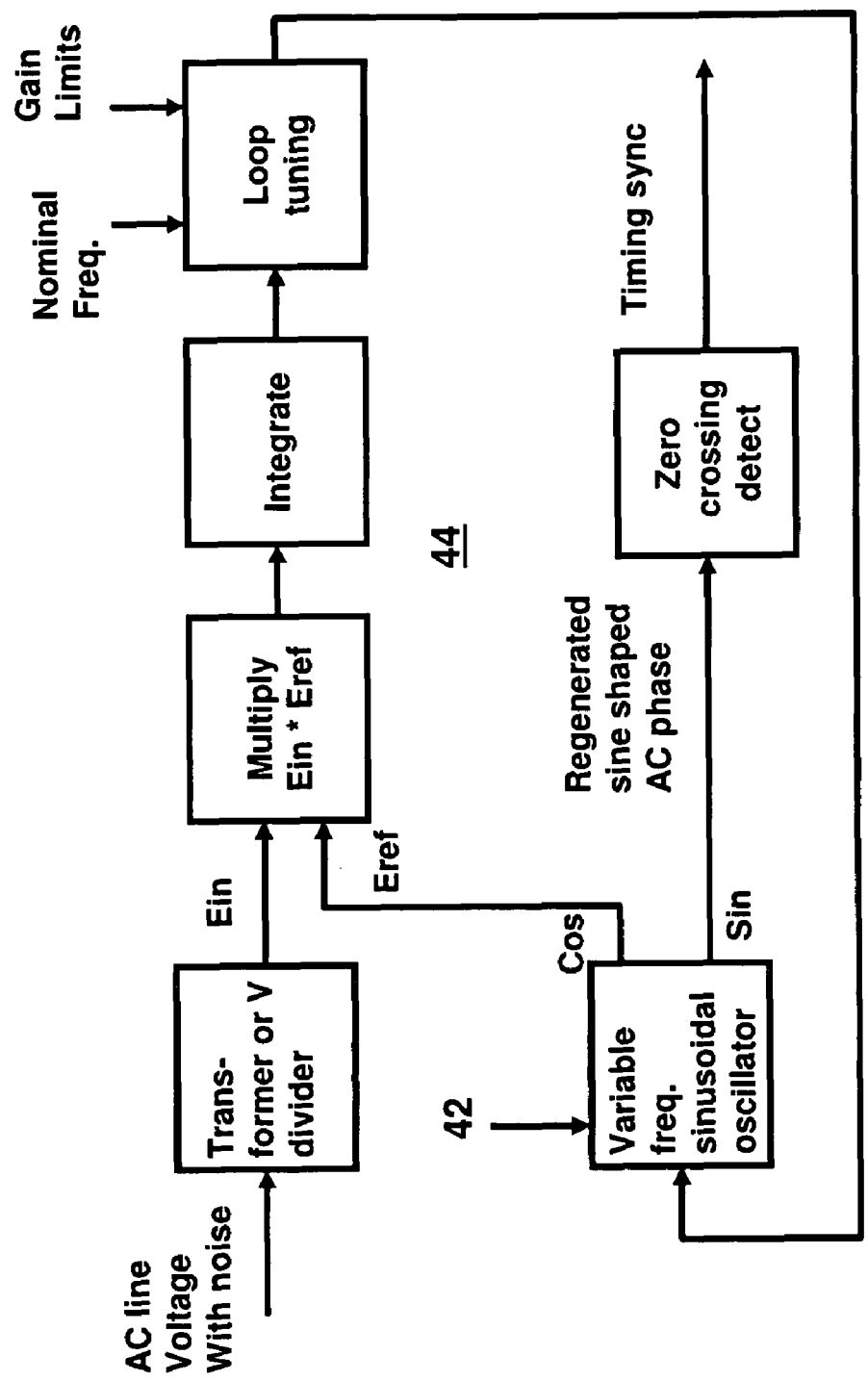
FIG. 5 shows a block diagram of a phase locked loop for sine wave recovery from an AC signal.
Figure 6:
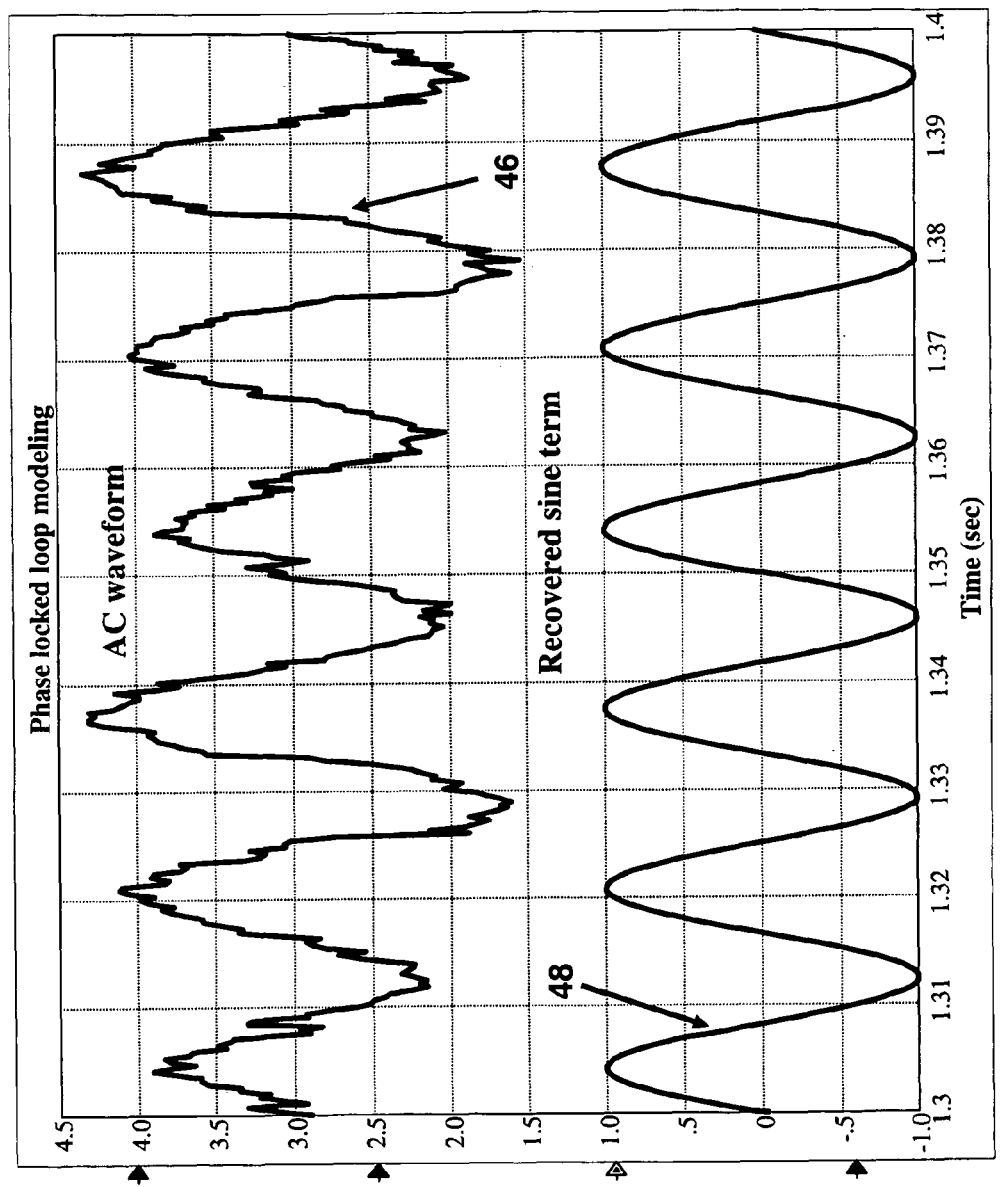
FIG. 6 shows a simulation for the results of a sine wave recovery in the presence of noise.

The AC voltage 31 can contain noise and distortion that may make conventional zero crossing timing determination inaccurate. This can be remedied by filters, or a phase locked loop based on sine wave recovery. The use of such a phase locked loop for sine wave recovery in presence of noise is well-known in the prior art, but for completeness it is illustrated in FIG. 5. A variable frequency oscillator 42 is tuned via an integrating feedback loop 44 until the cosine term falls in quadrature with the incoming noisy signal sine term. The integration can utilize a long time constant since line frequency does not jitter rapidly. The sine term of the variable oscillator 42 represents the fundamental phase of the noisy incoming power. This method can be implemented in hardware or software for the data acquisition module 36. The result of a simulation of this technique for sine wave recovery in the presence of noise is shown in FIG. 6 where the AC waveform is shown at 46 and the recovered sine term is shown at 48.

Typical latencies and receive delays of high speed packet communications like IEEE 802.11 are shorter than one period of the AC line frequency, that is, less than 16.66 milliseconds for a line frequency of 60 Hz or less than 20 milliseconds for a line frequency of 50 Hz. However, in large network environments or when there is significant signal loss at larger distances, data re-transmission and packet delays may exceed the period of one AC line cycle. This could potentially upset a synchronization based on strictly only AC zero crossing, by an integer number of AC power cycles.

Figure 1:
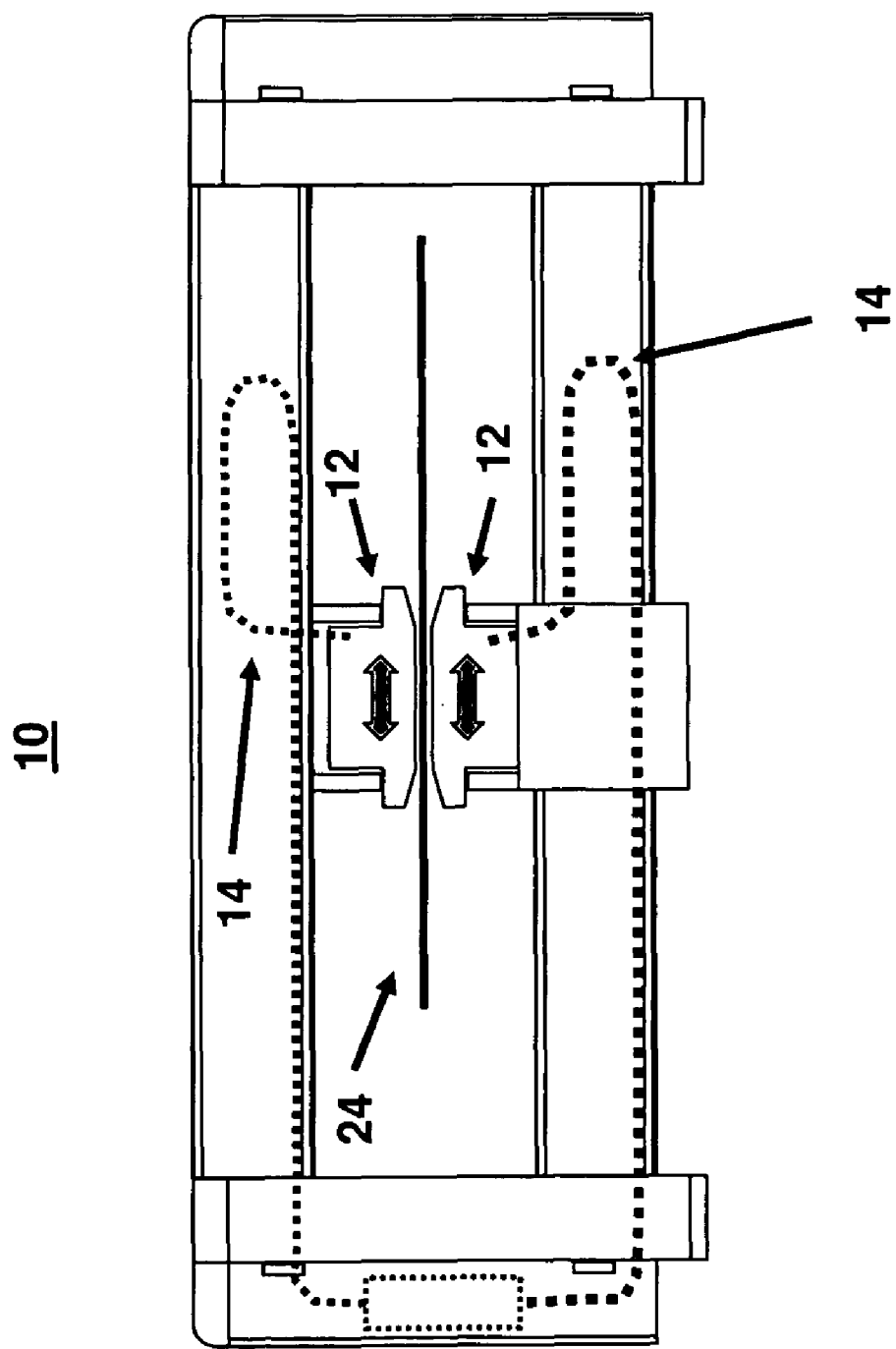
FIG. 1 shows schematically a scanner typically used in the flat sheet industry.
Figure 2:
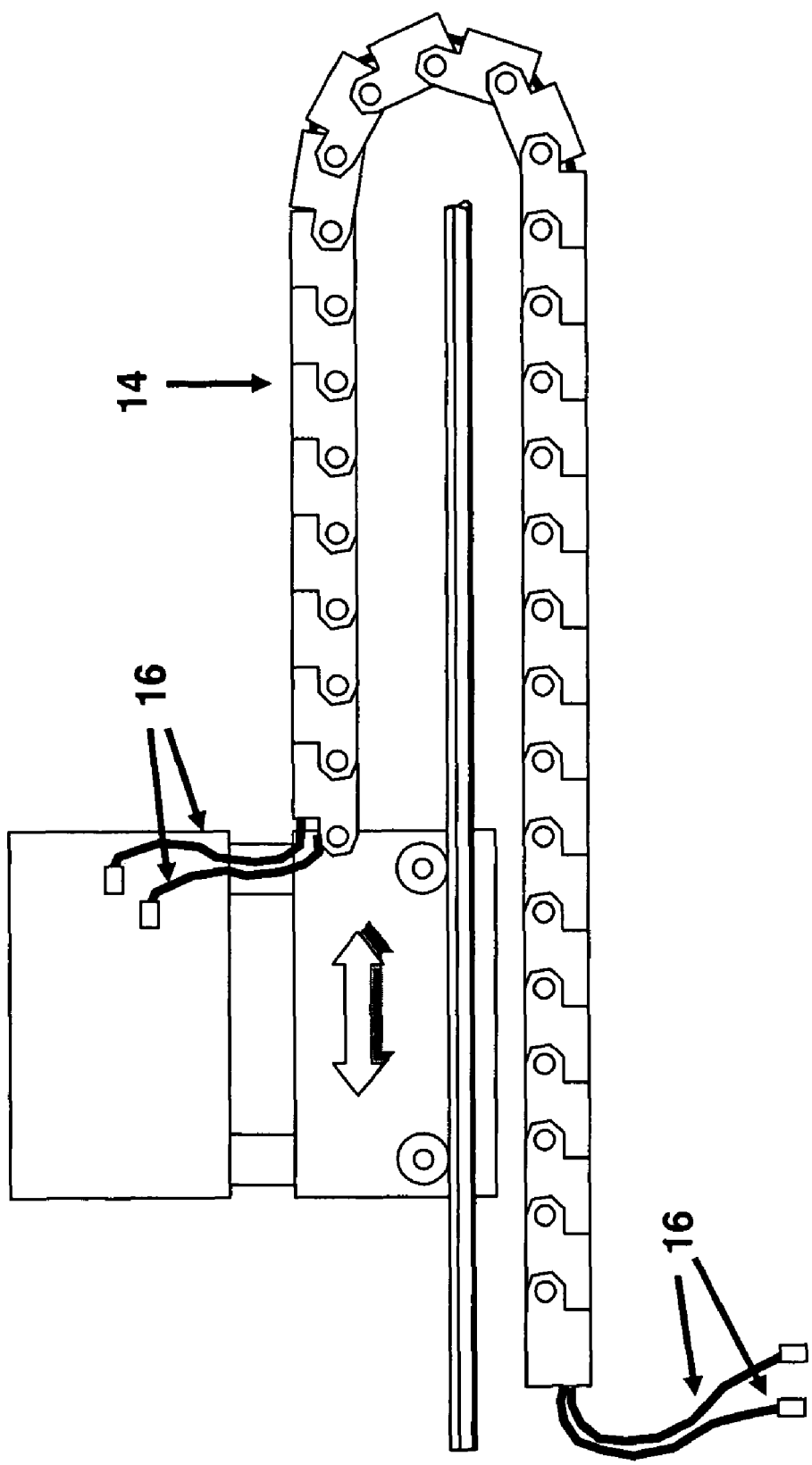
FIG. 2 shows details of the scanner's moving head and flex cable track.
Figure 3:
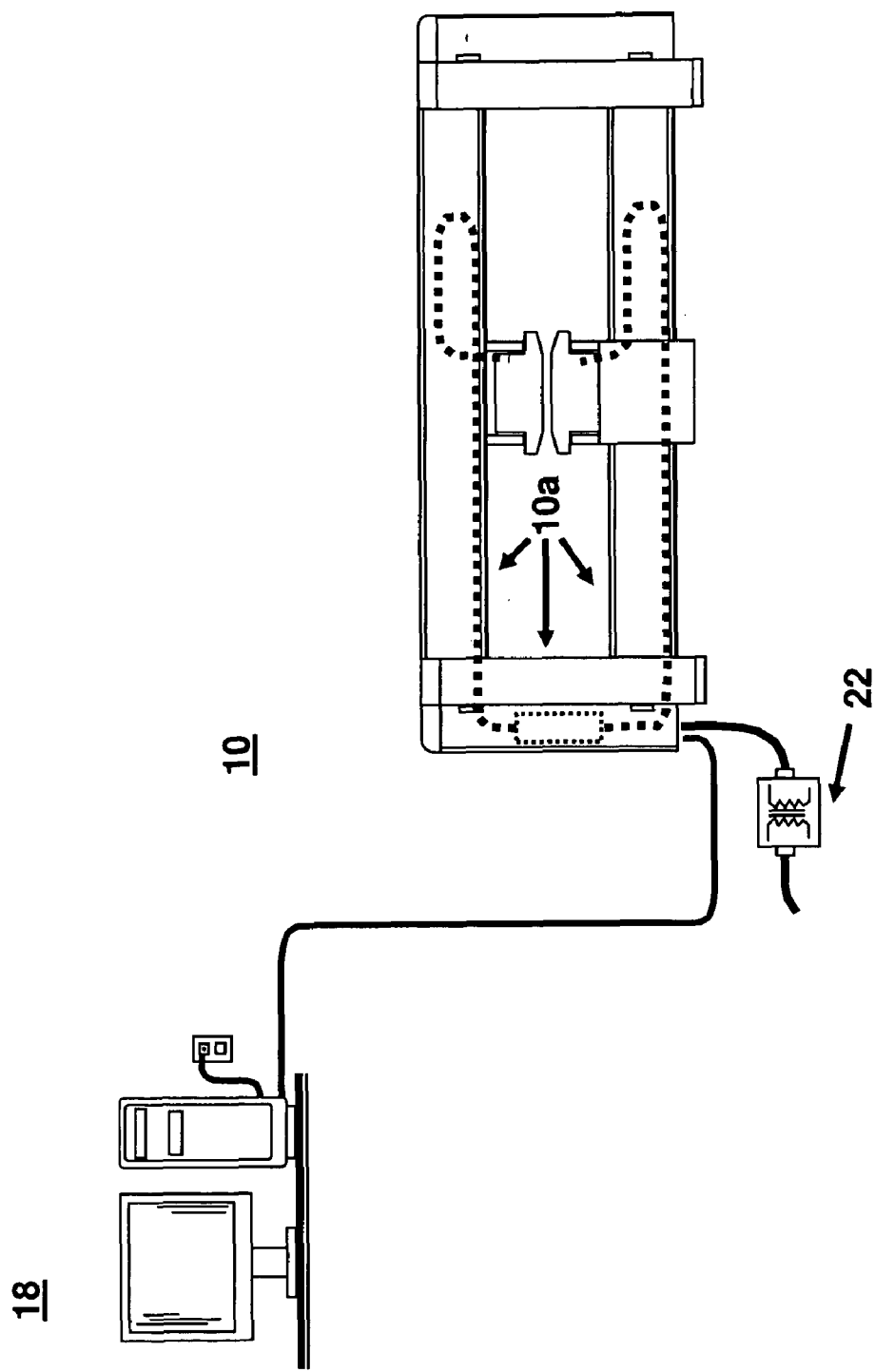
FIG. 3 shows a scanner connected to a central computer.

To remedy this possible upset in the synchronization, the present invention at startup coarsely synchronizes the distributed data acquisition clocks within one AC cycle. This synchronization includes a timing calibration message at startup, sent from the central computer node to the remote data acquisition nodes with a response back to the computer 18 shown in FIG. 3 or the central computer 50 shown in FIG. 7 to achieve a coarse communications delay calibration test. This coarse synchronization can be a non sophisticated standard software solution since it does not need tighter precision than better than one AC power cycle.

The present invention achieves ultimate timing accuracy by the process signals to AC power phase for every line cycle. For quality assurance and automated diagnostics, the coarse calibration message may be repeated at regular intervals, for instance once every 5 minutes, while only counting AC frequency periods occurs in between for each node.

Figure 7:
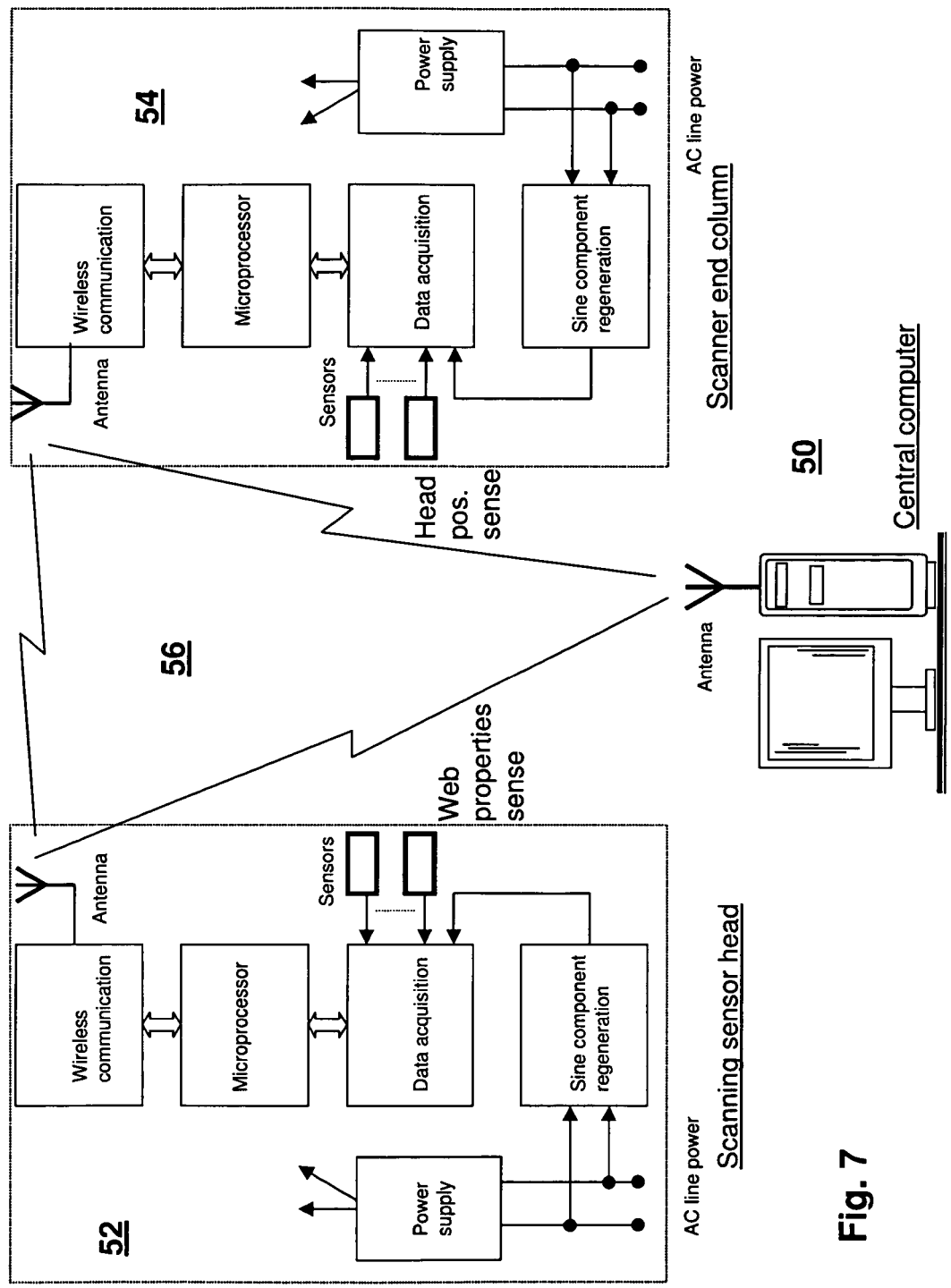
FIG. 7 shows the wireless remote data acquisition system embodied in accordance with the present invention adapted for one scanning head, the scanner end column and wirelessly networked to a central computer.

FIG. 7 shows a system 56 in which the wireless remote data acquisition of the present invention is adapted to one scanning head 52 and the scanner end column 54 and is wirelessly networked to the central computer 50.

The central computer 50 may for example be located in the process control room, in a computer server room, in an electrical equipment room, in the paper test lab, or in an enclosure on the sheet making machine floor.

The task of the scanning head unit 52 is to gather sensor signals at a high speed during each scan. The scanner end column unit 54 has the main task of controlling the head motion and providing head position information at a high rate. The central computer 50 has as a main task the display of the measured web profile.

The combination of process sensor information and scanner end column head position information into profiles can occur in any of these three nodes 50, 52, 54 since they are fully networked. The only requirement is that the node where this calculation is performed receives AC phase timing information from both the head 52 and the end column 54, derived from the separate AC monitoring functions. This timing information is used to time-skew the wave forms from the two separate nodes 52 and 54 to coincide in time regardless of wireless packet communication or individual node data processing delays. The resulting profile is in simplistic expressions the final result of these two time synchronized wave forms (process sensor measurement and head position) re-arranged as an x/y graph.

One central computer 50 may serve one wireless measurement network including several scanners 10 within data rate restrictions. The task of accurately combining information from several scanners 10 to one information (for instance, to derive coat weight) is aided by the common time synchronization for all the nodes.

Figure 8:
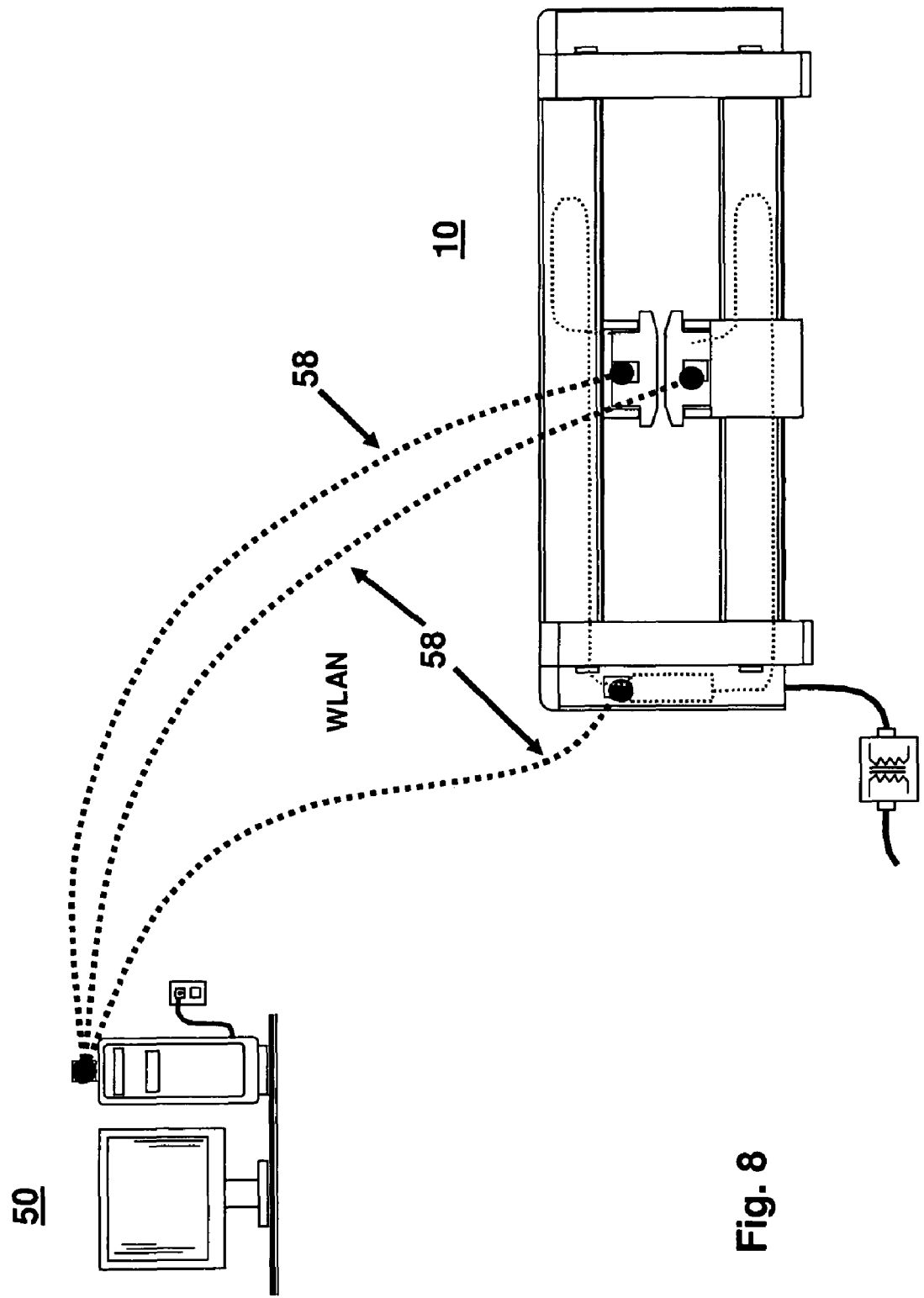
FIG. 8 shows a physical installation view for the system of FIG. 7.

FIG. 8 shows the system 56 of FIG. 7 in a physical installation view where the dotted lines 58 represent the wireless communication in the scanner 10 and between the scanner and the central computer 50 as indicated by the notation "WLAN" where the "W" indicates that the communication is wireless.

Figure 9:
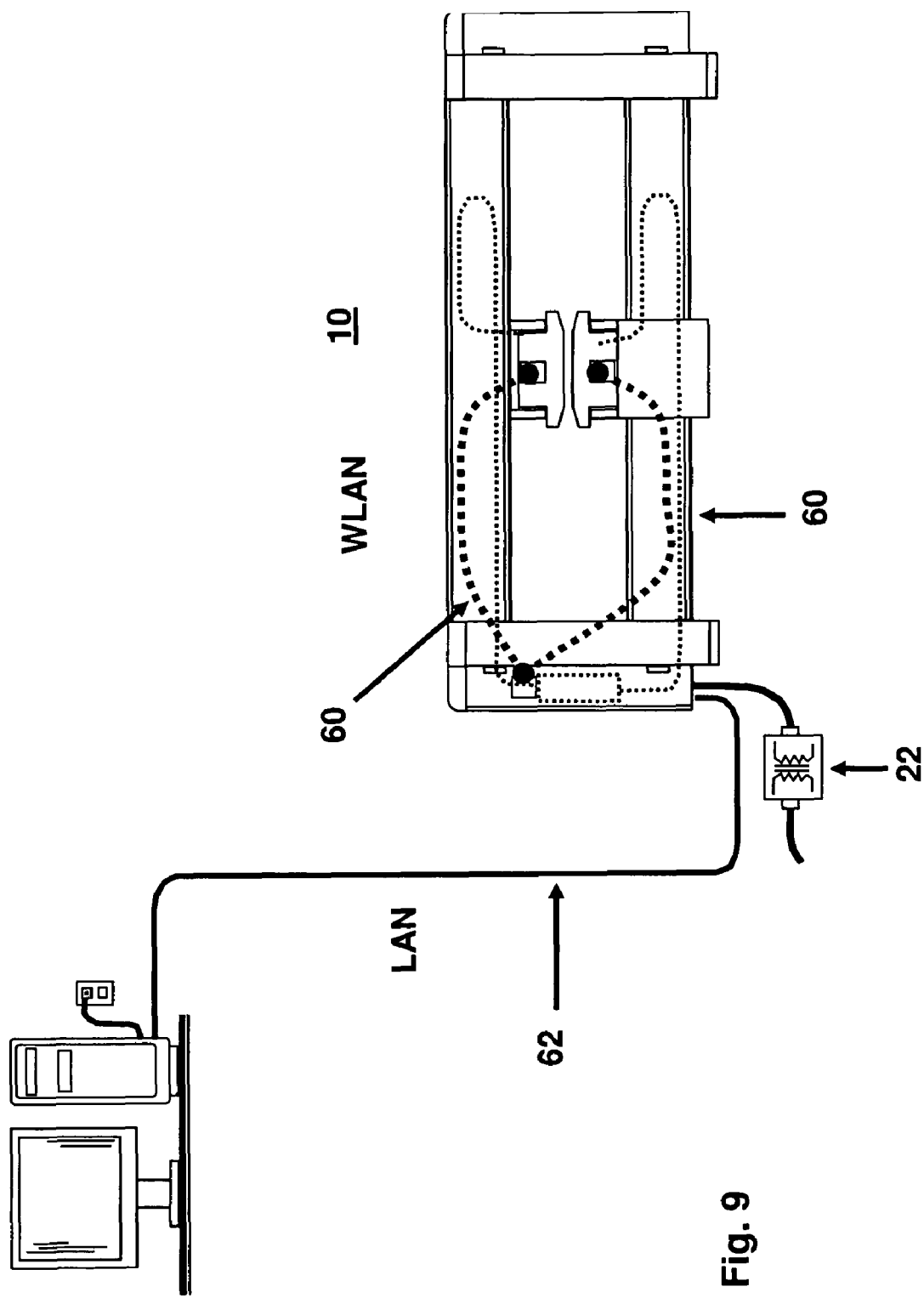
FIG. 9 shows an embodiment for the present invention where wireless communication is used in the scanner and a LAN cable is used to connect the scanner to the central computer.

FIG. 9 shows an embodiment of the invention where wireless communication is utilized inside the scanner 10 as shown by the dotted lines 60 and as is indicated by the notation "WLAN" and the connection from the scanner 10 to the central computer 50 is by a conventional LAN cable 62 shown by the solid line. This embodiment of the present invention eliminates flexing of the signal cable. The internal communication structure in the scanner 10 still uses the sine wave recovery in the presence of noise method such as the phase locked loop shown in FIG. 5. This method offers flexibility in the internal wireless communication since it is only short-haul.

Figure 10:
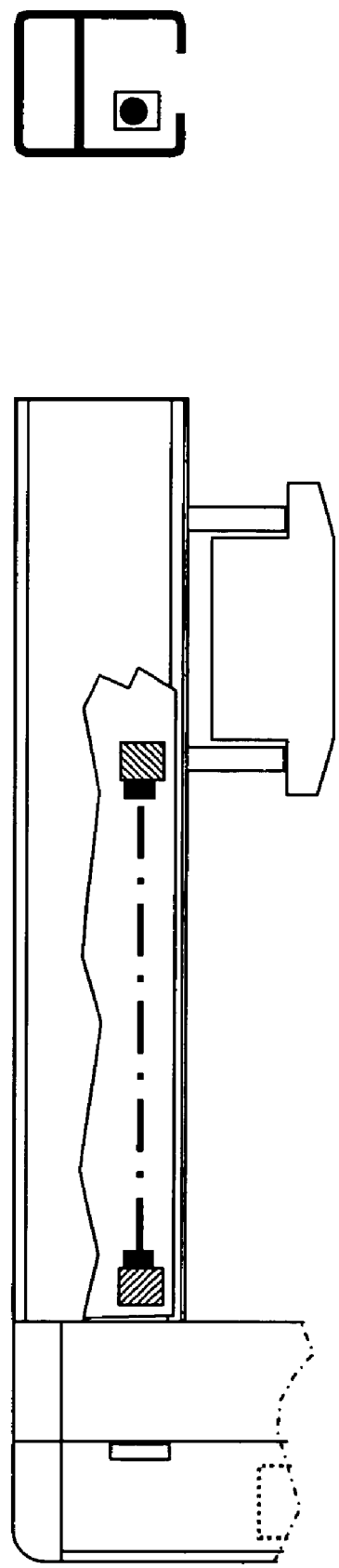
FIG. 10 shows an embodiment of the invention for end column to scanning head communication using internal Line-Of-Sight (LOS) optical communication such as infrared data association (IrDA).

FIG. 10 shows an embodiment of the invention for end column to scanning head communication using internal Line-Of-Sight (LOS) optical communication such as infrared data association (IrDA). In this embodiment, standard IrDA communication ports and devices are augmented with a Line-of-Sight directive lens or reflector optics to safely have a range covering a maximum length scanner (usually, 12 meters). The advantage with this embodiment of the present invention is the potentially low cost of IrDA, adequate speed 4 Mb/s and high data security due to very little "signal leakage". The basic timing relations in this variant still follow the principles of the sine wave recovery method, one example of which is shown in FIG. 5.

Figure 11:
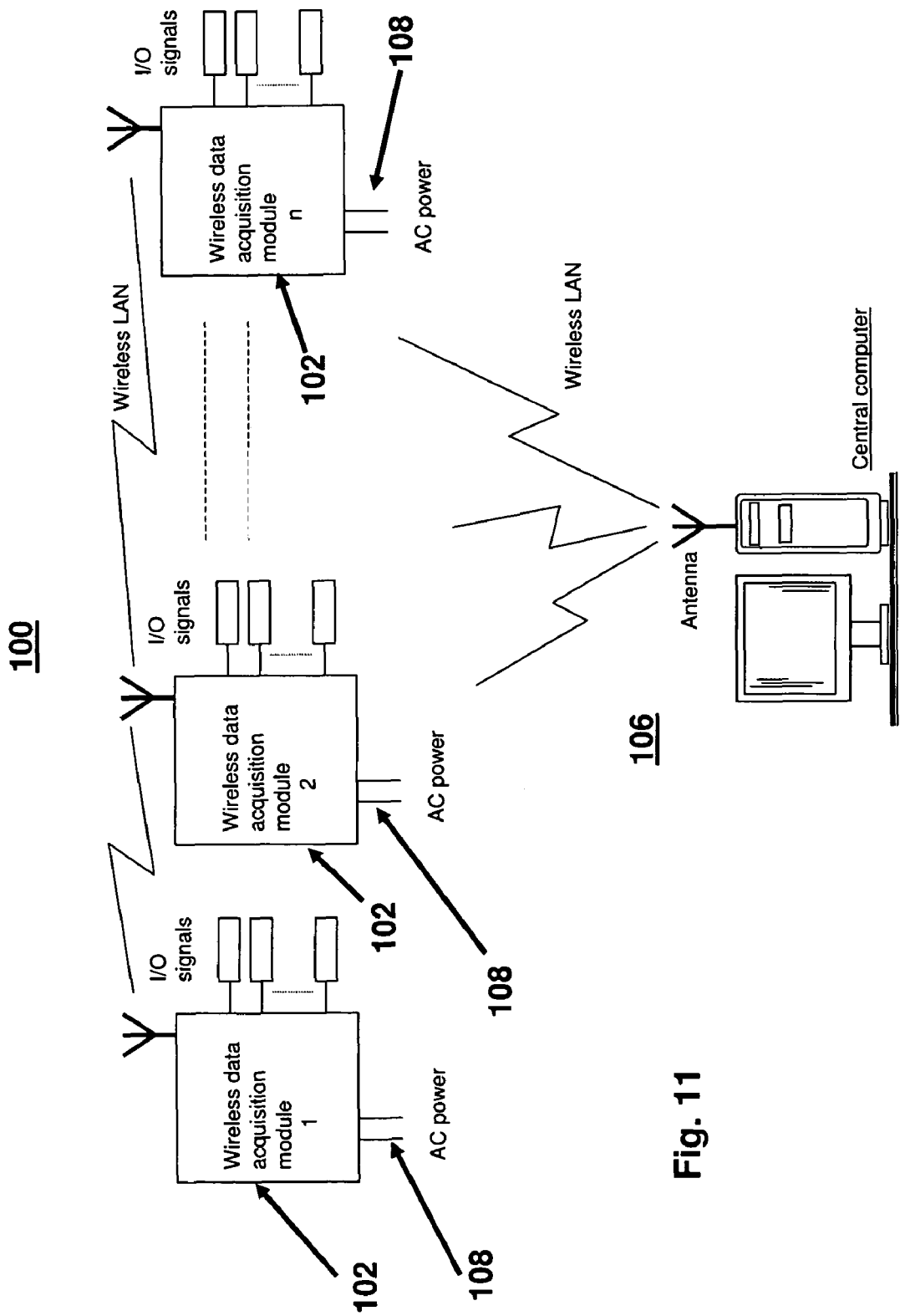
FIG. 11 shows an embodiment of the present invention for non-scanner, general wireless purpose data acquisition and control.

FIG. 11 shows an embodiment of the present invention for non-scanner, general wireless purpose data acquisition and control where time synchronization of acquired events between nodes is important to approximately a millisecond or better. The system 100 shown in FIG. 11 has n nodes each identified by the reference numeral 102. Each node 102 has in it the wireless data acquisition system described above and shown in FIG. 4. Each node 102 receives I/O signals 104 that have data about events associated with system 100. Each node 102 receives AC power 108 from the same power system which is not shown in detail solely for ease of illustration. System 100 also has a central computer 106 that also has a wireless communication link to all of the nodes 102. Thus FIG. 11 shows that the present invention is not limited to scanning process measurement.

In any of the radio frequency based schemes described above, a service work station consisting of a note book PC or a PDA with suitable WLAN interface may be added. This work station can with proper software provide access and visibility of nodes provide communications for status, raw data streams, calculated values, commands, alarms and tuning information. This task is eased by the current popular trend to offer built-in wireless LAN like IEEE802.11b as part of standard portable computers or PDAs.

It should be appreciated that in accordance with the present invention, signal transfer in process scanners may occur either from the sensor head 52 to the scanner end column 54 or all the way from the sensor head 52 to the control room. It should be further appreciated that in the present invention the scanner 10 does not have a signal cable to connect the sensor head 52 to the stationary end column 54 and thus there is no concern that the flexing of such a cable by the back and forth scanning will give rise to a possible failure of the cable. It should also be appreciated that the present invention by using AC line synchronization eliminates the influence of variable packet/computer delays on the accuracy of the measurements made by the sensor head. Further, it should be appreciated that as is described above the present invention is adaptable for general purpose wireless data acquisition.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for time synchronizing signals in a sheet making system that has two or more nodes separated from each other that each receive signals having data therein about sheet making events associated with each of said two or more nodes, said method comprising:

providing at each of said two or more nodes a wireless system for acquiring at each of said nodes said signals having said associated sheet making events data, each of said wireless systems having a distinct processing device; and comparing at each of said two or more nodes the timing of associated sheet making events data signals to the timing of the AC voltage waveform on a power line connected to power each of said two or more wireless sheet making events data acquiring systems to thereby time synchronize said associated sheet making events data signals at each of said two or more nodes to each other.

2. The method of claim 1 further comprising determining at each of said two or more nodes the timing of said AC voltage waveform on said power line.

3. A method for time synchronizing signals in a sheet making system that has two or more nodes separated from each other that each receive signals having data therein about sheet making events associated with each of said two or more nodes, said method comprising:

providing at each of said two or more nodes a wireless system for acquiring at each of said nodes said signals having said associated sheet making events data, each of said wireless systems having a distinct processing device and a data acquisition clock; and using an AC power signal on a power line connected to power each of said two or more wireless sheet making events data acquiring systems as a source of a common clock for all of said two or more wireless sheet making events data acquiring systems data acquisition clocks to time synchronize said associated sheet making events data signals at each of said two or more nodes to each other.

4. The method of claim 3 further comprising comparing at each of said two or more nodes the timing of said associated sheet making events data signals to the timing of said AC power signal to thereby derive from said AC power signal said common clock.

5. The method claim 3 further comprising coarsely synchronizing within one cycle of said AC power signal said two or more wireless sheet making events data acquiring systems data acquisition clocks at startup of said system having two or more nodes separated from each other.

6. A sheet making system comprising:

two or more nodes separated from each other;

each of said two or more nodes comprising a wireless system for acquiring at each of said nodes signals having associated events data, each of said wireless systems receiving signals having data therein about events associated with a respective one of each of said two or more wireless systems and connected to receive AC power from a common source of AC power; and each of said two or more wireless systems comprising:

a circuit that obtains from said common source of AC power an associated events data acquisition clock that is the same for all of said wireless systems at said two or more nodes to thereby time synchronize said associated events data signals at each of said two or more nodes to each other; and a distinct processing device.

7. The sheet making system of claim 6 further comprising a computing device in communication with each of said two or more wireless systems.

8. The sheet making system of claim 7 wherein said computing device causes when said sheet making system is started up each of said two or more wireless systems to coarsely synchronize within one cycle of said AC power signal said two or more sheet making events data acquiring systems data acquisition clocks.

9. The sheet making system of claim 7 wherein said computing device causes at predetermined intervals of time when said sheet making system is operational each of said two or more wireless systems to coarsely synchronize within one cycle of said AC power signal said two or more sheet making events data acquiring systems data acquisition clocks.

10. The sheet making system of claim 7 wherein communication between said computing device and each of said two or more wireless systems is either wireless or by a cable connected between said computing device and each of said two or more wireless systems.

11. The sheet making system of claim 6 further comprising a scanner across a moving sheet made by said system, said scanner comprising one or more sensor heads movably mounted on said scanner, said moving sheet between said one or more sensor heads, said scanner causing said one or more sensors to traverse back and forth across said moving sheet to thereby provide signals that can be used to generate a profile of said moving sheet.

12. The sheet making system of claim 11 wherein said scanner comprises an end column and one of said two or more nodes is associated with said sensor heads and another of said or more nodes is associated with scanner end column.

\* \* \* \* \*